March 26, 1963
R. R. KELLER
3,082,849
PANEL UNIT WALL
Filed Oct. 16, 1959
4 Sheets-Sheet 1
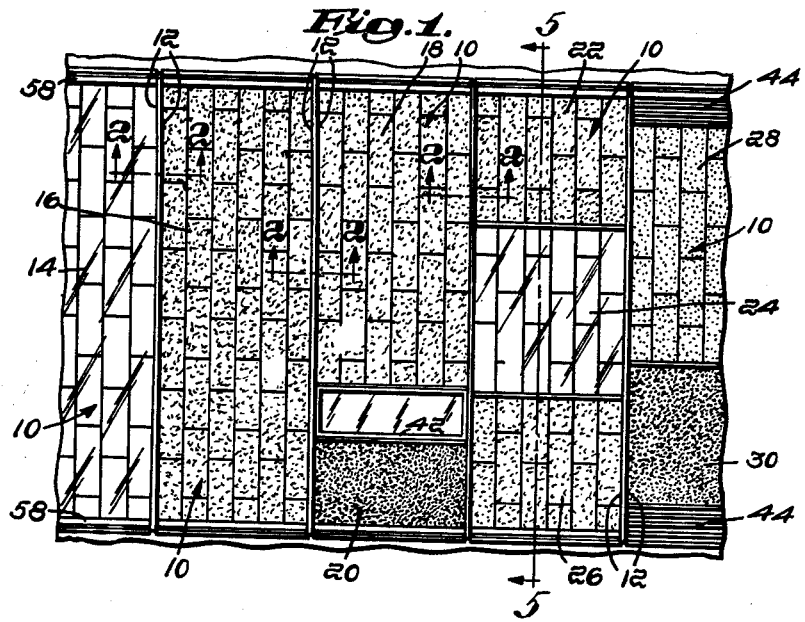
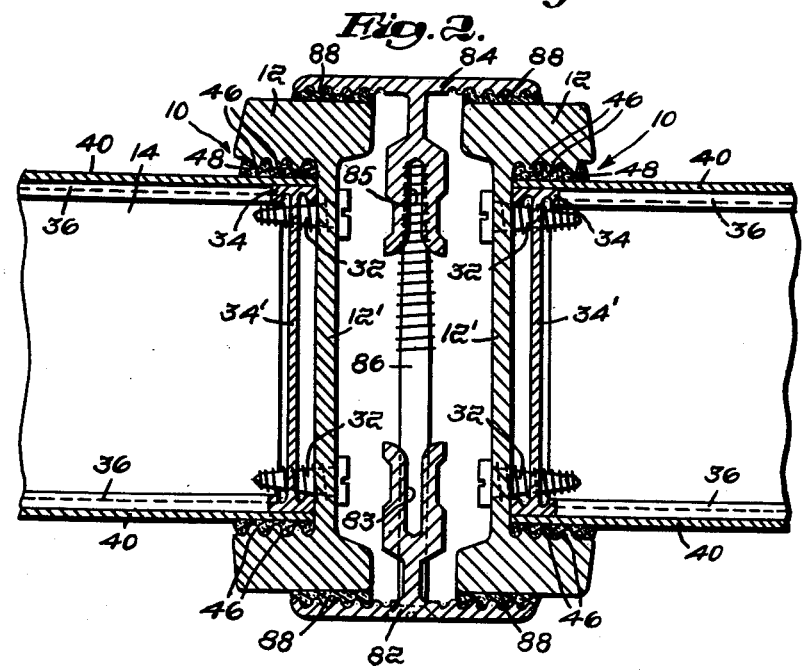

March 26, 1963  R. R. KELLER  3,082,849
PANEL UNIT WALL

Filed Oct. 16, 1959  4 Sheets-Sheet 2

March 26, 1963 R. R. KELLER 3,082,849
PANEL UNIT WALL
Filed Oct. 16, 1959 4 Sheets-Sheet 3
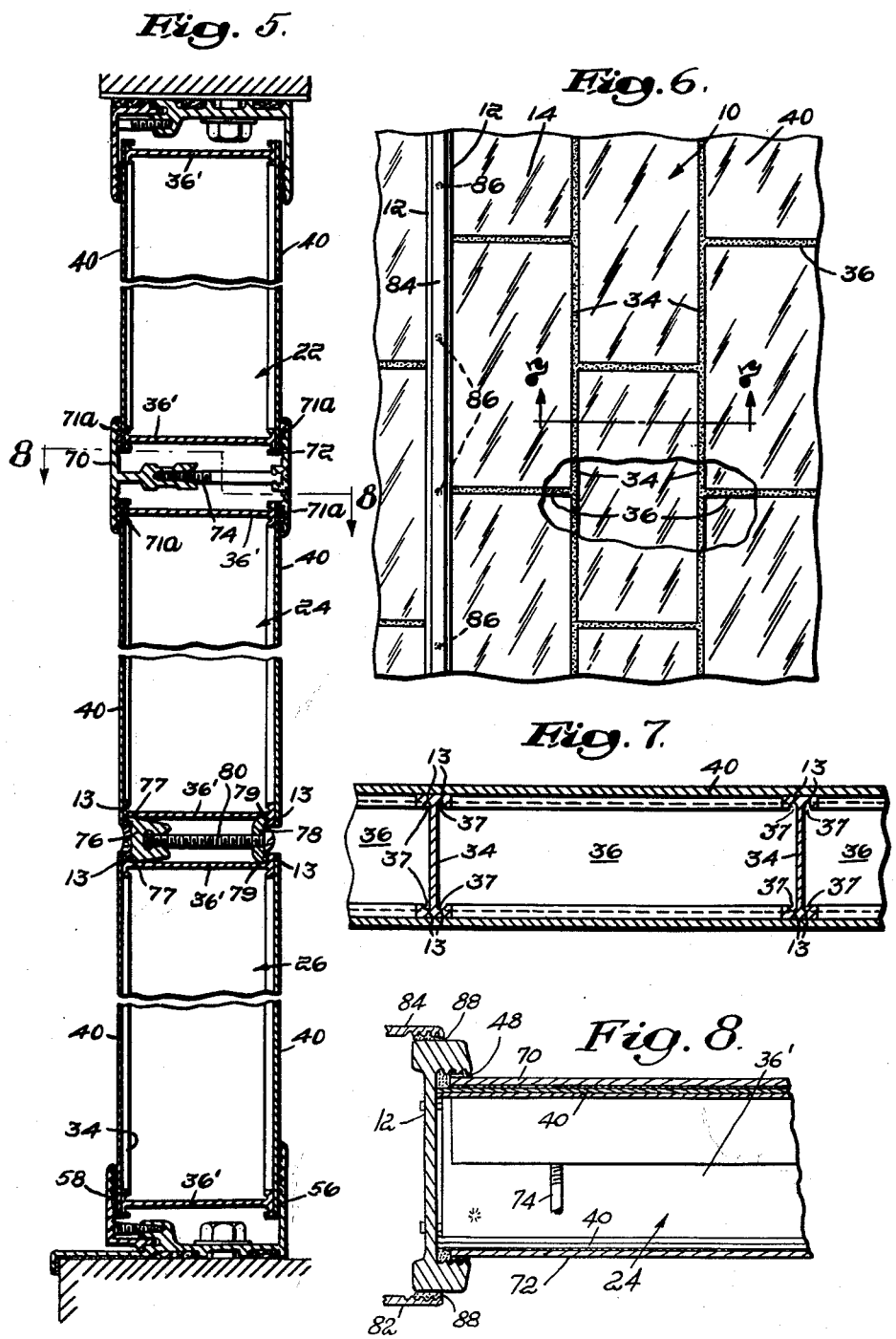

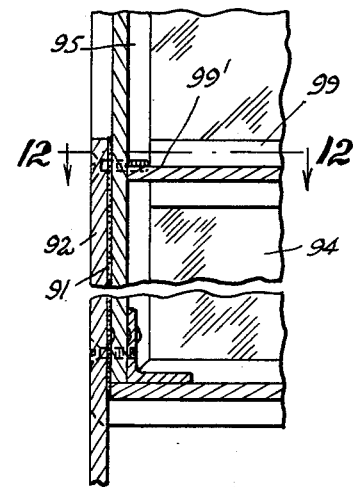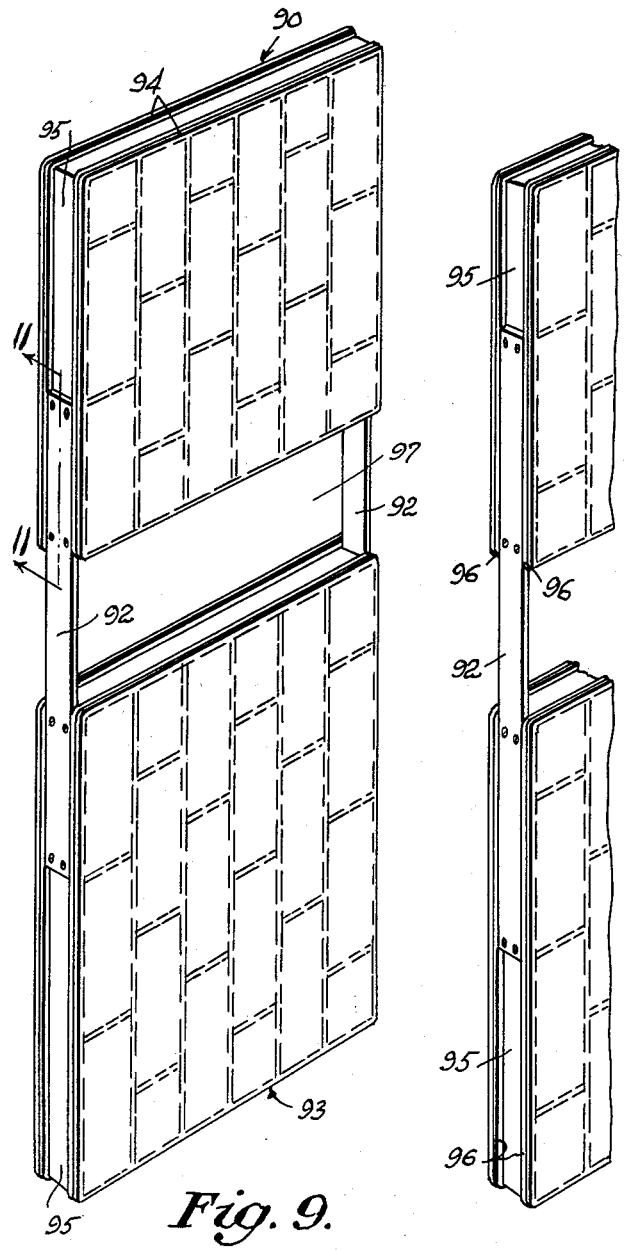

United States Patent Office 3,082,849
Patented Mar. 26, 1963

3,082,849
PANEL UNIT WALL
Robert R. Keller, 150 Milford St., Manchester, N.H.
Filed Oct. 16, 1959, Ser. No. 847,013
7 Claims. (Cl. 189—34)

This invention relates to improvements in load-bearing structural panel-units and is a continuation-in-part of my copending applications Serial Nos. 486,112 now issued as Patent No. 2,931,468 and 778,008. The invention provides lightweight prefabricated load-carrying structural panel-units fabricated of either one or a number of structural panels, with windows, louvres, etc. as desired. The panel-units may be of suitable dimensions for extending the entire height of the side wall of a single story or the height of two stories of a building, a number of panel-units being joined side-by-side on the job to provide complete load-carrying building walls.

Thin sheet materials, metals and fiber compositions, and especially plastics, reinforced with glass fibers, wire mesh and the like have considerable advantages as building materials. For instance, reinforced thermosetting plastic sheets of polyester and epoxy resins and sheets of the newer types of acrylic plastic are durable; they are inert with respect to contaminants found in the atmosphere; they have a pleasing appearance; and they are produced in extremely thin, continuous sheets.

An important characteristic of these sheet materials is their inherent high strength. Another is the light weight per unit area of the material.

These materials have been used in the past as facings for the walls, but not as significant structural components of the walls. Heavy independent frame members have been employed to support the facings against normal wall loadings in the prior art structures, and the facings have served merely as inner or outer decorative and protective sides of buildings without taking stress.

According to the instant invention, however, a prefabricated panel-unit is provided, which utilizes the full strength of these sheet plastics or other similar materials; a panel-unit constructed according to the invention may be a meter wide and six meters long, so light that one man can lift it, and so strong that when joined with other such panel-units by suitable clamps, a strong wall is created without need of additional supports or braces.

The invention comprises the combination of one or more structural sandwich panels in an elongated panel-unit with unique longitudinal load-spreading members along the two longitudinal sides of the panel-units, engaging the sides of the structural sandwich panels, in a unique manner.

A structural sandwich panel for a panel-unit of the invention preferably comprises reinforced plastic sheets or similar materials bonded to an open core fabricated of aluminum or plastic. Load-spreading members, preferably of aluminum, engage the opposite longitudinal edges of the structural sandwich panel, to distribute load stresses from one portion of a panel to another, and from windows and louvres, in the panel-unit to adjacent panel portions, so as to utilize the full strength of the structural sandwich panels in the panel-unit, and for stiffening. The union between a load-spreading member and to a matching structural sandwich panel edge, according to the invention, is accomplished by utilizing a channel as one, with the other fitting inside the channel and effectively engaging the opposite interior flange surfaces whereby bending forces are transmitted.

The invention will be more fully understood with reference to the following detailed description of preferred embodiments, in the accompanying drawings wherein:

FIG. 1 is an elevational view of a portion of a building wall comprising prefabricated panel-units embodying features of the invention;

FIG. 2 is a cross-sectional view on any of the lines 2—2 of FIG. 1, on a greatly enlarged scale illustrating details of construction of two adjacent panel-units, and means for joining them together to form a wall;

FIG. 5 is a cross-sectional view of a composite panel-unit of FIG. 1, with central portions of each of the three panels of the panel-unit broken away;

FIG. 6 is a face view of a portion of panels of FIG. 1 with a facing partially broken away;

FIG. 7 is a cross-sectional view on line 7—7 of FIG. 6 on an enlarged scale;

FIG. 8 is a sectional view of a composite panel-unit of FIG. 1, taken on line 8—8 on FIG. 5;

FIG. 9 is a perspective view of a composite short span panel-unit according to the invention;

FIG. 10 is a perspective of the unseen side of the panel in the view thereof in FIG. 9;

FIG. 11 is a magnified partial cross-sectional view of the short span panel-unit of FIG. 9 taken on line 11—11; and FIG. 12 is a section on line 12—12 of FIG. 11.

Figure 3:
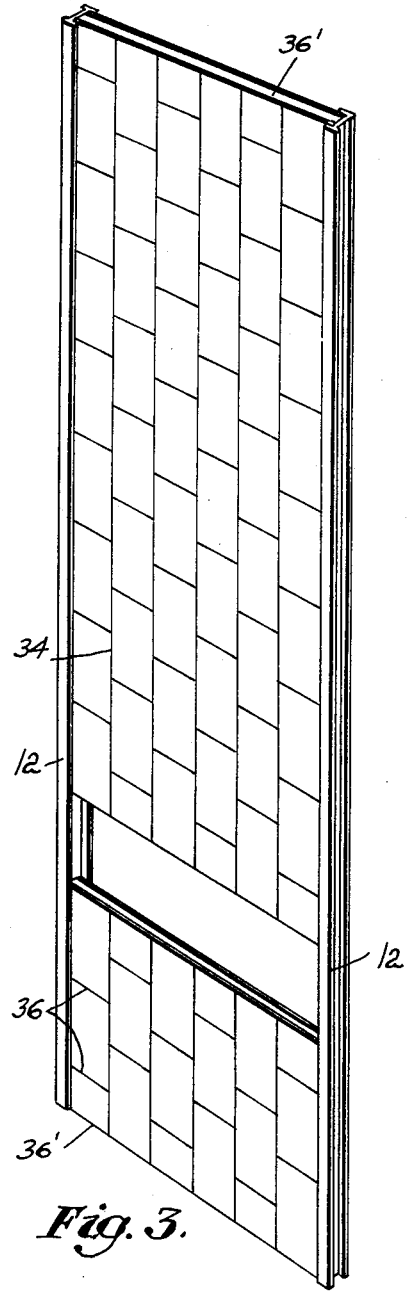
FIG. 3 is a perspective of a composite panel-unit adapted to receive a window.
Figure 4:
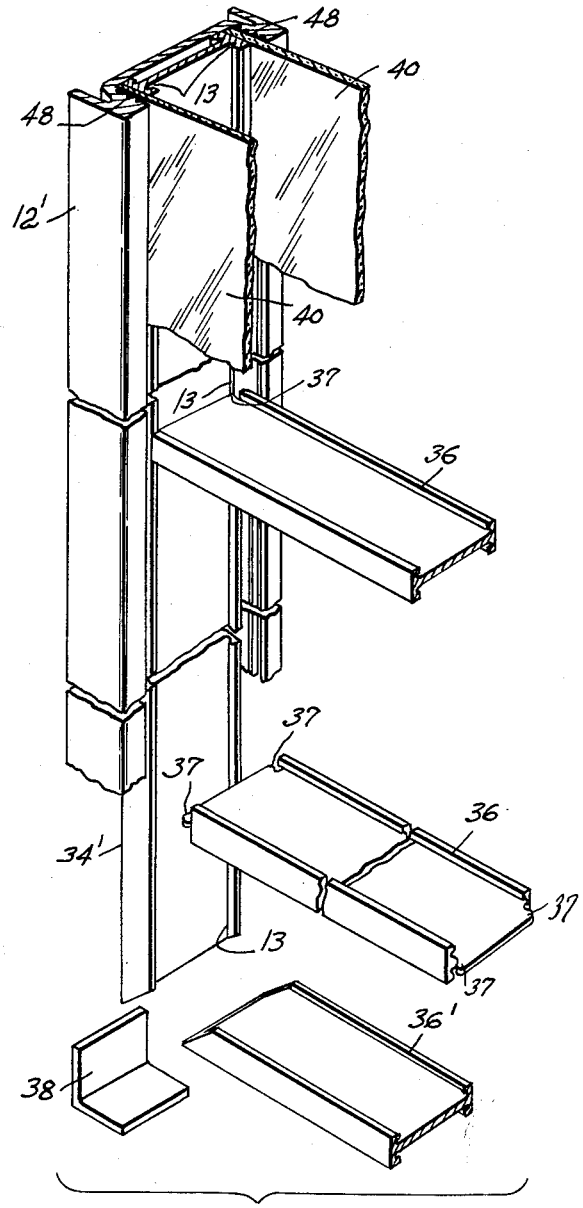
FIG. 4 is an exploded partially cut-away view of a corner portion of a panel-unit, illustrating an open core of a preferred structural sandwich panel employed in the panel-unit and a lighter weight variation of a load-spreading channel member.

Referring to the drawings, a building wall is illustrated in FIG. 1, comprised of prefabricated panel-units 10 joined side-by-side, of which three are shown complete and two others are partially broken away. Each panel-unit 10 extends the height of the wall. A load-spreading channel member 12 extends along each longitudinal edge of each panel-unit. As illustrated in FIGS. 2, 3 and 4, the side portions of each structural panel are confined within the channel defined by the opposed flanges of each channel member 12. The channel members and the structural sandwich panels are effectively joined together by sealing material 48 interposed between inside surfaces of the flanges and the matching margins of the faces of the structural panels.

Each of the sandwich panels 18, 20, 22, 24, 26, 28 and 30 is preferably comprised of reinforced plastic inner and outer facing sheets extending across opposite faces of an open core and bonded thereto. As shown in FIGS. 4–8, the core is preferably formed of small interlocked aluminum core elements 34, 34', 36, 36' providing oppositely directed flange surfaces for bonding to the facing sheets. Long core elements 34 are preferably parallel with load-spreading I-beam members 12, and shorter core elements 36 extend at angles between the elements 34, elements 34' being longitudinal side core elements and elements 36' being side core elements at the upper and lower horizontal edges of the respective structural panels. As preferred for ease of assembly of the core, the inner surfaces of the flanges of the panel core elements are longitudinally grooved at 13, and the ends of the elements 36 have projections 37 thereon for engaging in the grooves 13 of the elements 34 and 34', as best seen in FIGS. 4 and 7. Similarly, the ends of elements 34 have projections thereon for engaging in grooves in upper and lower edge elements 36' as best seen in FIG. 5. At the four corners, intersecting side elements preferably have their ends mitered and secured together by interior angle members 38 which are fitted into the grooves 13 and secured by having web portions of the elements indented thereinto. The facing sheets 40 of reinforced plastic are secured to the core to form the structural sandwich panel by lamination with heat and pressure to the outer flange surfaces of all the core elements 34, 34', 36, 36', with each facing sheet continuous over the core elements. These bonds stiffen the facing sheets against buckling to withstand compressive loading. Moreover, the facing sheets of the sandwich panels can take high tensile stress without failure, due to the spaced-apart bonded core elements which spread stress concentrations across the facing sheets. Thus bending of the sandwich is resisted by both facing sheets, and the sandwich panel is capable of withstanding much higher loads than the core alone could stand.

The facing sheets 40 may provide transparent, translucent or opaque panels, as may be desired, depending on the material selected. In light-transmitting panel-units the core elements creat decorative shadow patterns. Color effects may be provided in the transparent and translucent panels by means of color inserts which may be provided in particular spaces of a panel defined by its core elements.

Referring to FIG. 1, a panel-unit 10 may have a single structural sandwich panel 14, 16 or a panel-unit 10 may be a composite structure, comprising panels as exemplified at 22, 24, 26 with a transparent panel 24 between the two translucent panels 22, 26. The center panel-unit 10 shown in FIG. 1 comprises a translucent panel 18 and an opaque panel 20 with a window 42 between them, and the extreme right-hand unit 10 of FIG. 1 comprises a translucent panel 28 and an opaque panel 30 with louvres 44.

As mentioned above, each prefabricated panel-unit 10 has opposite edges of its structural panel or panels secured between flanges of two channel members 12, see FIGS. 2, 3 and 4. The flanges of the channels overlap inner and outer face margins along opposite faces of each structural panel and are effectively joined by sealing material. The inner surfaces of the flanges defining the members 12 are grooved or otherwise roughened at 46 for locking the sealing material 48 against displacement, and for promoting a good seal. When a panel-unit is erected as a wall the sealing material serves as an effective seal at the exterior against rain and in the interior as a vapor barrier preventing condensation of moisture inside the panel-unit. Where somewhat higher strengths are required the sealing material may be also a bonding agent, e.g. a polysulfide.

Screws 32 serve to bring the channel members 12 tightly against the sandwich panels, wedging in the sealing material during assembly. These screws are introduced from the outside of channel members 12 through the webs thereof and into the webs of the core structure of the sandwich panels. Additionally, the screws are important in transferring stress between the channel members 12 and the sandwich panels under diagonal and other loading conditions. Accordingly, the screws are preferably positioned along webs of side core elements 34' near points of abutment of the core elements 36 and 36', whereby stress is best distributed. For improved holding one side of each screw may be brought in contact with a side of a web of an abutting core element as it is screwed in, as illustrated in FIGS. 10 and 11 hereafter discussed.

Referring to FIG. 5, the structural details of one preferred composite panel-unit are disclosed. Adjacent structural panels are secured together by sealing clamps. In an interior clamp, strip members 76 and 78 have projections 77 and 79 respectively which engage opposite grooves of core elements 36' of adjacent structural sandwich panels. Bolts 80 force these strips apart by providing firm engagement.

In an exterior clamp, strips 70 and 72 are provided with opposite jaws 71a which are drawn together by self-tapping screws 74, and with sealant interposed engage margin portions of adjacent structural panel faces effectively joining them together. As seen in FIG. 8 end portions of these transverse strips 70 and 72 extend under the roughened flanges of the longitudinal load-spreading channels 12 along the sides of the panel-unit, and with the sealant 48 about the ends of these strips an extremely tight joint having a neat appearance is obtained.

In assembling structural panel-units as a wall where the panel-units carry their own weight and wind loads but do not support the roof, it is preferred to use the sill and head clamps illustrated in FIG. 5 which permit vertical expansion and contraction of panel-units, while firmly securing these panel units as wall members. These preferred clamping means each comprises a fixed jaw 56 secured to a support and a movable jaw 58 which is drawn up by screws towards the fixed jaw.

Referring to FIG. 2, adjacent prefabricated panel-units 10 are secured together in sealed relation, along their vertical edges by T-strips 82, 84, clamping jaws which are drawn relatively toward each other by means of screws 86 suitably spaced along the strip engaging outer portions of member 12 with bonding material 88 therebetween. The T-legs of the T-strips 82, 84 are formed with longitudinal grooves 83, 85 therein and screws 86 extend through the strip 82 and the T-leg thereof and are threaded into the T-leg of strip 84. The screws are self-threading and form threads in the opposite walls of groove 85 as the screws 86 are driven.

Referring to the short span composite panel-unit of FIGS. 9–12 a structural sandwich panel 90 comprised of a core and facing sheets 94 laminated thereto, is joined with sides aligned with a similar structural sandwich panel 93 with an intervening space 97 between the panels 90 and 93 adapted to receive a window in an appropriate frame. The structural panels are joined together in the short span panel-unit as follows. Opposite sides of each of the structural sandwich panels are formed by core elements 95, providing outer flanges 96 defining side channels. The outer surfaces of these flanges are bonded face-to-face to the facing sheets 94. Side channels of adjacent panels are aligned and load-spreading stiffener plates 92 are inserted in these channels. Each of the stiffener plates 92 spans the gap between the two structural sandwich panels, and extends a substantial distance, e.g. 20 inches, along the side of each structural panel. Each stiffener plate 92 is a rigid bar having a rectangular cross-section with a width conforming with the distance between the inner flange surfaces defining the side channels, and for neat appearance, preferably having a thickness equal to or less than the side overhang of the flanges, for concealment. These plates fit snugly within the channels, with the plate edges engaging the inner surface of each of the opposite flanges 96 of elements 95. Bonding material 91 is held between the web of the core elements 95 and the inner face of each stiffener plate 92. Screws between the stiffener plate and the webs of core elements 95 serve to hold the stiffener plates in position to constitute a strong bond, and to transfer loads between the stiffener plates and the sandwich panels under certain loading conditions.

Accordingly, as illustrated in FIGS. 11 and 12, it is preferred that the screws enter the webs of core elements 95 at points near other core elements 99 which extend across the facing members, abutting the side core elements 95. As illustrated, the screws preferably also engage the web 99' of the core element 99 as shown for improved holding and stress transfer.

A short span panel-unit can also comprise a single structural sandwich panel similar to panels 90 and 93 of FIG. 9. Along the longitudinal sides of the structural sandwich panel extend stiffener plates as described in conjunction with the composite short span panel-unit of FIG. 9. These plates stiffen the structural sandwich panel when under bending loads, spreading the stress from the center portion of the panel to end areas.

Consideration of a single prefabricated panel-unit fixed at both top and bottom and subjected to a roof load upon the top and a uniform wind loading broad side to a face (the outer face) of the panel-unit is now presented as an aid in understanding the nature of the strength of the panel-units constructed according to the invention.

Under these loads the sandwich panel of the unit tends to bend with maximum deflection at the center, maximum tension stress at the inside and maximum compression stress at the outside of the panel, and maximum sheer stresses occurring at top and bottom of the panel.

The inner plastic face of the sandwich panel is under tension. The bonded core elements aid in distributing local stresses across the inner plastic face, and the entire face thus serves as a structural component. The outer face is under compression and being substantially stiffened by the bonds of the sandwich core likewise performs as a structural component. Deflection of the sandwich panel is restricted by the flanges of the channel members 12 which engage the panel face edge margins in the panel-unit constructed according to FIGS. 1 through 8; or by the edges of the stiffener plates 92 which engage opposite inner flanges of core elements 95 in the short span panel-unit constructed according to FIGS. 9 through 12. In either case the sandwich panel is stiffened against extreme bending, stress is transferred to the channel members 12, or stiffener plates 92, and these members themselves tend to bend slightly along their lengths. At points along the structural sandwich panel spaced from the area of maximum deflection, bending of the channel members 12 or the stiffener plates 92 is resisted by the sandwich panel. Accordingly, stress is partly transferred back into those portions of the structural sandwich panel. Both the channel members and the stiffener plates serve as load-spreading members, permitting maximum use of the natural strength of the structural sandwich panels.

Although the stress distribution in the panel-unit varies with the type of loading and the particular construction of the panel-units, it should be understood that the sandwich panel faces and the stress spreading members are all essential to the general strength of the panel-unit.

An open panel core as described is preferred, but core elements of other shapes in an integral core assembly can also be utilized, as well as other types of cores. It is, however, necessary that structural sandwich panels be employed.

Those composite panel-units including windows and louvres resist loading in generally the same way, except that a greater proportion of the loading is transferred to the load-spreading members in those special areas where the window or louvre structures do not have structural strength as great as the sandwich panels, and these loads are spread back into the sandwich panels spaced apart therefrom. Additionally, in composite panel-units, the load-spreading members play a role in joining adjacent panels, windows and louvres into the composite prefabricated structure.

Prefabricated panel-units constructed in accordance with the invention are rigid modular units which replace the heavy mullions and floating panels of conventional curtain-type building walls. The normal loading is distributed throughout the entire building wall formed by these panels joined together. The load-spreading members and core elements of the prefabricated panel-units are preferably of aluminum to insure lightness, with such strength and load-carrying capacity as to be self-supporting under standard design wind loads. Hence, panel-units may be shipped and handled with a minimum of expense and trouble and can be quickly erected on the job in attractive and effective building wall structures.

It should be understood that the herein disclosed panel-units are designed and constructed whereby all of the components of the panel, especially the facing members, are utilized as load-carrying components, with substantial savings in weight and cost over prior comparable building panels.

The panel-units of the present invention effectively sustain not only loads supported on the tops of panel-units, but wind and snow loads axially and generally broad side of the units and so-called diagonal loads.

What is claimed is:

1. A prefabricated building wall panel-unit comprising a structural panel having a wide core and wide, continuous facing sheet strength members bonded to oppositely directed faces thereof, said core having two parallel sides defined by elongated, side-core elements in load-transferring relationship with the remainder of the core, each providing a web surface and having two spaced-apart flanges extending from said web surface, outer surfaces of flanges of each being bonded face-to-face to corresponding margin portions of said sheet members in a load-transferring relationship, opposed inner flange surfaces and said web surface of each defining an elongated channel, and two rigid, elongated load spreading members, one corresponding with each channel secured therewithin with oppositely directed surfaces of each load spreading member disposed to engage the opposed inner flange surfaces in a load transferring relation.

2. The panel-unit of claim 1 wherein the core is comprised of a multiplicity of identical cross-section, oppositely flanged core elements connected together, each having its outer flange surfaces bonded face-to-face to overlying portions of said sheet members.

3. The panel unit of claim 1 wherein the load spreading members have a mutual longitudinal extent beyond the structural panel adapted to receive and support a window, and to transmit loads exerted thereon into said structural panel.

4. A composite prefabricated building wall panel-unit comprising a plurality of structural panels arranged in a lengthwise series with sides of the panels being aligned at longitudinal sides of the panel-unit, each structural panel comprising a wide core and wide, continuous facing sheet strength members bonded to opposite faces thereof, each of said cores having two elongated, side-core elements in load-transferring relationship with the remainder of the core, each providing a web surface and having two spaced-apart flanges extending from said web surface, each side-core element defining one of said aligned sides, outer surfaces of the flanges thereof being bonded face-to-face to corresponding margin portions of said sheet members in a load-transferring relationship, and opposite inner flange surfaces and said web surface of each defining an elongated channel, said plurality of structural panels being secured together in a load transmitting relation by two rigid, elongated, load spreading members, one extending lengthwise at each of the longitudinal sides of the panel-unit, each load spreading member being shaped to fit, and secured within the corresponding elongated channel of each of the plurality of panels, with oppositely directed surfaces of each load spreading member disposed to engage the opposed inner surfaces of the core elements in a load transferring relation.

5. The panel-unit of claim 4 wherein a space is provided between adjacent structural panels of said plurality adapted to receive a window, said load spreading members engaged with said structural panels spanning said space being thereby adapted to engage the window and to spread loads therefrom into said adjacent structural panels.

6. A prefabricated lightweight panel unit comprising a structural panel and two parallel, rigid load-spreading members, said structural panel having a core assembly comprised of a peripheral rectangular core frame comprised of rigid side-core elements and a plurality of intermediate rigid core elements at least some of which are directly connected to said side-core elements at substantial angles thereto in a load-transferring relationship providing two oppositely directed networks of bonding surfaces, said structural panel also having two continuous facing sheet strength members, one overlying each of said networks of bonding surfaces and being bonded thereto, said core elements being comprised of aluminum and said facing members of reinforced plastic, two parallel side-core elements comprising in part said peripheral frame each having a side web surface, and a pair of overhanging flanges defining with said web a channel, the outwardly directed surfaces of said flanges being bonded to corresponding margin portions of said facing members in a load-transferring relation, each of said load-spreading members being shaped to fit within the channel of one of said side-core elements, and being secured therewithin, with surfaces of said load-spreading member directed towards said inner flange surfaces, each load-spreading member also having a surface corresponding with said web surface, a bonding agent disposed between said corresponding surfaces and a plurality of self-tapping metal screws securing said load-spreading member against said surface whereby said side-core elements and said load-spreading members are secured together in a load-transferring relation.

7. The panel unit of claim 6 wherein the channel defined by each of said side-core elements has a rectangular cross-section, and the load-spreading member which corresponds with each having a rectangular cross-section conforming thereto with a thickness not exceeding the overhang of the flanges with respect to the web whereby said load-spreading members are concealed.

References Cited in the file of this patent

UNITED STATES PATENTS

| | | |
|---|---|---|
| 1,984,007 | Babbitt | Dec. 11, 1934 |
| 2,137,623 | Mussey | Nov. 22, 1938 |
| 2,403,565 | Triller | July 9, 1946 |